United States Patent
Perlsweig (10) Patent No.: US 6,526,916 B1
(45) Date of Patent: Mar. 4, 2003

(54) PET FOUNTAIN

(76) Inventor: Leon Perlsweig, 23017 Gainford St., Woodland Hills, CA (US) 91364

( * ) Notice: Subject to any disclaimer, the term of this patent is extended or adjusted under 35 U.S.C. 154(b) by 0 days.

(21) Appl. No.: 10/055,392

(22) Filed: Jan. 23, 2002

(51) Int. Cl.[7] .................................................. A01K 7/06
(52) U.S. Cl. ........................... 119/74; 119/76; 239/28; 239/29.5
(58) Field of Search .................. 119/74, 75, 76, 119/163; 239/23, 24, 28, 29.5

(56) References Cited

U.S. PATENT DOCUMENTS

| | | | |
|---|---|---|---|
| 1,120,940 A | * 12/1914 | Jolley | 119/76 |
| 1,372,371 A | * 3/1921 | Ross | 119/51.5 |
| 1,497,256 A | 6/1924 | Ackerman | |
| 3,272,181 A | * 9/1966 | Ramsey | 119/76 |
| 4,469,049 A | * 9/1984 | Waynick | 119/76 |
| 4,757,784 A | 7/1988 | Hammer | 119/75 |
| 4,813,378 A | 3/1989 | Lapp | 119/73 |
| 4,924,812 A | * 5/1990 | Bernays, Jr. | 119/76 |
| 5,201,442 A | 4/1993 | Bakalian | 222/610 |
| 5,350,082 A | * 9/1994 | Kiriakides et al. | 221/1 |
| 5,501,178 A | 3/1996 | Kemp | 119/74 |
| 5,613,464 A | 3/1997 | Petzel | 119/55 |
| 5,799,609 A | * 9/1998 | Burns et al. | 119/74 |
| 5,842,437 A | 12/1998 | Burns | 119/74 |
| 5,934,221 A | 8/1999 | Kirschner | 119/72 |
| 6,279,508 B1 | * 8/2001 | Marchant et al. | 119/75 |

* cited by examiner

Primary Examiner—Charles T. Jordan
Assistant Examiner—Susan C. Alimenti
(74) Attorney, Agent, or Firm—Baker Botts LLP (57) ABSTRACT

A portable, pet-actuated drinking fountain includes a reservoir container received in a housing and a movable platform which is depressed against a spring when a pet steps on it. Downward movement of the platform by the pet closes a switch that connects battery power to a pump that provides a gentle bubbling of water from the container via a vertical spigot reachable by the pet. Excess water drains back into the reservoir container through a filter screen. When the pet steps back off the movable platform, the pump is deactivated. One or more movable platforms may be associated with a single reservoir container and arrange to actuate the pump.

11 Claims, 8 Drawing Sheets

PET FOUNTAIN

This application relates to drinking fountains for pets, and more particularly, to self-contained drinking fountains activated by pets on demand, which do not require external plumbing for water supply or drainage nor external power supplies.

BACKGROUND OF THE INVENTION

Proper care of household pets requires that a supply of potable drinking water be available. Typically, a dish or bowl, filled by the pet owner, is placed on the floor of the home in a place accessible to the pet and the animal drinks from it when thirsty, often splashing water on the adjacent floor, and requiring frequent refilling.

It has been found that pets often prefer to drink from a flowing fountain and various attempts have been made in the past to provide arrangements for providing flowing water to the pet. The simplest forms consist merely of pipes or spigots connected to the household water supply which provide continuous flow. These expedients, however, are extremely wasteful of water and improvements have been made to have the flow controlled by the pet as needed. Generally, these improvements comprise flow valves activated by pets depressing a platform or lever to open the valve and allow the flow of water. Because of the pressure of conventional water supplies, these valves and their activating means have to be relatively robust and carefully made to protect against potentially damaging leaks. Moreover, suitable drainage must be provided for excess water.

Because these forms of pet drinking devices must be connected to a central water supply, they are not conveniently portable, and to the extent to which they may be moved, they must be reattached to a water supply and drain at the new location.

SUMMARY OF THE INVENTION

In accordance with the present invention, a self-contained, pet-actuated drinking fountain is provided which does not require attachment to a water supply for its operation. A battery-operated pump is supported in a container or bowl for holding a supply of water, with the container being accommodated by a housing. When activated, the pump feeds water from the pre-filled container to a pipe extending vertically from the container, providing a spout of water at a sufficient height to allow the animal to drink comfortably.

To actuate the pump, an elevated platform is supported from the base of the housing in which the container is received by a plurality of springs mounted between the underside of the platform and the base of the housing. When a pet steps on the platform, its weight depresses the platform against the springs. Within the housing, a battery and a pressure-operated switch are connected to supply power to the pump when the switch is closed. The switch is mounted in the housing in a position to be closed when a pet steps on and depresses the platform.

The container, which may vary in volume to suite the needs of the pet or pets, is removable from the housing for cleaning and is fitted with a screen filter across the top of its opening for keeping solid debris out of the water supply.

Preferably, the capacity of the container or bowl is sufficiently large to retain a day's supply of water for the pet. Since the water from the spigot that is not actually ingested by the animal returns to the container, there is little or no waste.

The pet fountain may be provided with one or more spring supported platforms surrounding the container to enable more than one pet to drink simultaneously. In one embodiment, a plurality of separate platforms are provided. In another embodiment, a single platform, in the form of an annulus, is supported on springs around the container. Switches are mounted on the housing such that the weight of a pet anywhere on the annular platform will close a switch to activate the pump. In either of these embodiments, a spigot, divided into separate branches, may be provided to facilitate drinking by several pets at one time.

As will be seen, the pet fountain of the invention is completely self-contained and portable, permitting it to be used by pet owners when traveling with their pets, as well as at home.

BRIEF DESCRIPTION OF THE DRAWINGS

The invention and its features and advantages will be more completely understood from the following Detailed Description thereof, when taken in conjunction with the appended drawings, in which.

DETAILED DESCRIPTION OF THE INVENTION

Figure 1:
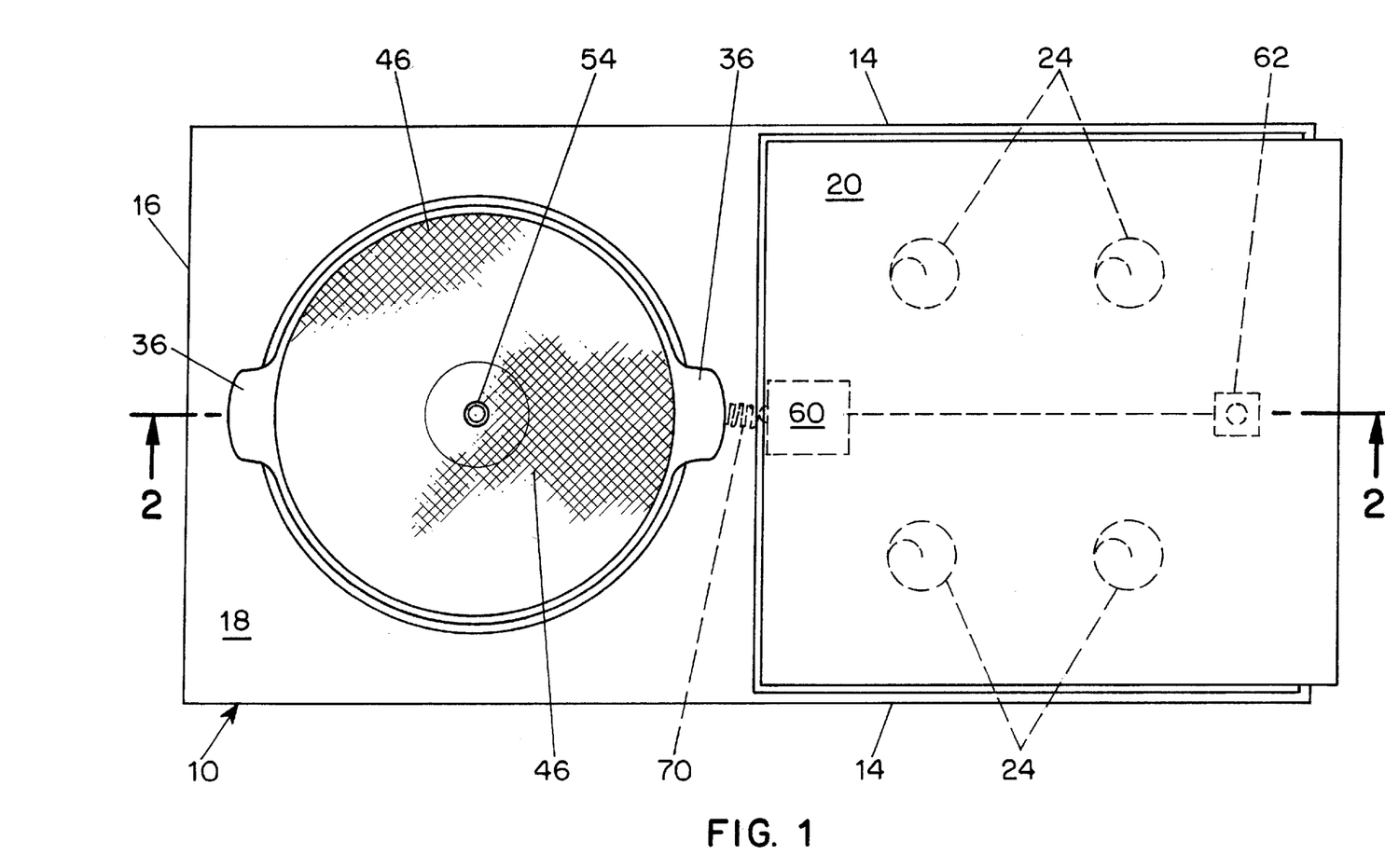
FIG. 1 is a plan view of one embodiment of the invention having a single spring supported platform adjacent the container.
Figure 2:
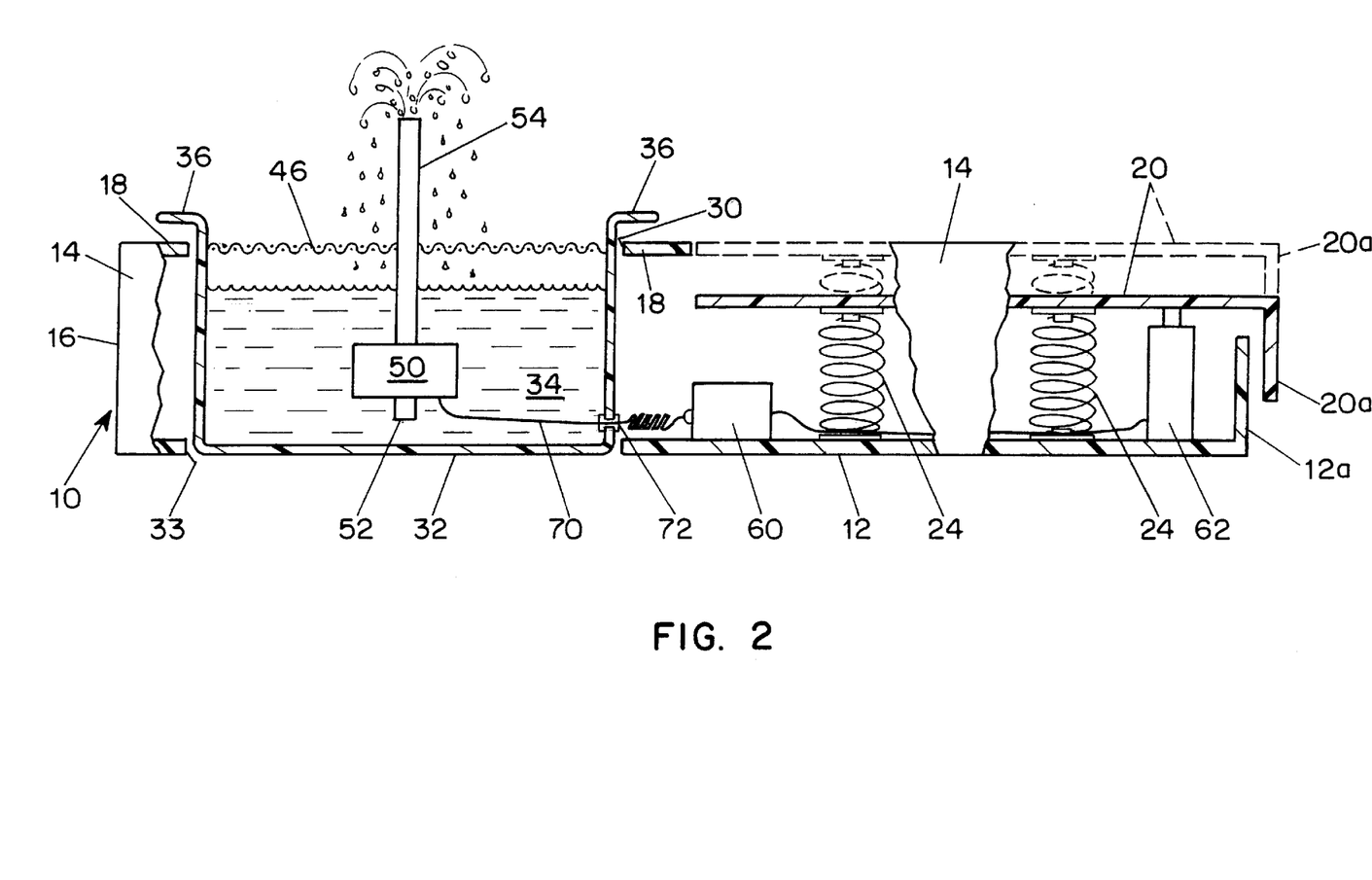
FIG. 2 is a cross-sectional view of the embodiment of FIG. 1, taken along the lines 2—2.

Turning now to FIGS. 1 and 2, the pet fountain of the invention comprises a housing 10, which in the embodiment illustrated may be in generally rectangular, box-like form, with a base 12, sidewalls 14, end wall 16 and a top 18. A depressable platform 20 is supported on a plurality of compression springs 24 so as to be movable downward from the plane of top 18. If desired, platform 20 may be hinged to the edge of top 18 by a continuous plano hinge or one or more smaller hinges.

The movable platform 20 is normally urged by compression springs 24 into an upward position, as shown in dashed line, in substantially the same plane as top 18. When downward pressure is applied to the upper surface of movable portion 20, such as by a pet stepping on it, it moves downwardly into the position shown in solid line in the drawing, between side walls 14, compressing springs 24.

A downwardly depending flange 20a extending along the free edge of movable platform 20 will serve to close off the housing against debris, both when the portion 20 in its upward position as shown in dashed line in the drawing and when depressed over upwardly extending flange 12a, as shown in solid line in the drawing.

An opening 30 is provided in the housing top 18 to receive a container 32 which provides a reservoir for water 34. Conveniently, the container is circular in shape, as seen best in FIG. 1, but any shape may be employed. A correspondingly shaped opening 33 may be provided in the base 12 of the housing, allowing the container to rest on a floor or other supporting surface. Alternatively, the container may simply rest on the base of the housing. The container 32 is provided with a pair of opposed extensions or handles 36 along its upper edge which facilitates removing and replacing it in the housing.

A pump 50 of the floating type is disposed within the container 32. The pump, which may, for example, be of the type known as the "Solar Island", manufactured by POWAMATE, LTD. (modified for battery power), has an intake 52 at its lower end and an upwardly extending pipe or spigot 54 at its upper, output end. Although illustrated as floating, the pump 50 may be fixed, such as supported from the bottom of container 32 by a suitable spacer (not shown) which does not restrict access to the pump intake 52.

Electrical power for the pump 50 is provided by battery pack 60 mounted within housing 10, connected as shown in FIG. 2, by electrical cord 70 to pump 50 and to a pressure operated switch 62 mounted on the base 12 of the housing. When platform 20 is depressed, it closes switch 62 to connect power from the battery pack to the pump. To facilitate removal of the pump 50 and the container 32 from the housing, circuit connections between the switch and battery in the pack 60 are provided in the battery pack so that the electrical cord 70 may be simply plugged in to a suitable socket in the battery pack. As shown in FIG. 2, the cord 70 extends through a watertight grommet 72 in the wall of the container and may include a coiled portion to allow for extension when the container is lifted from the housing.

Alternatively, the cord 70 may be connected to a watertight socket (not shown) molded in or cemented on the wall of the container. The external side of the socket receives a conventional plug which is wired in the battery-switch circuit. In either embodiment, the pump and container assembly may be readily disconnected from the rest of the construction so that they may be easily removed for cleaning, refilling and service.

A removable filter screen 46 rests on the upper edge of the container and closely surrounds spigot 54 to keep solid particles from entering the water.

Access doors in the walls or floor of the housing may be provided as needed to enable battery pack and switch connection and replacement.

Upon actuation of the pump, water is pumped upwardly through pipe 54 to provide a gently bubbling output at its upper end, appropriate for a household pet to drink comfortably. Excess water falls back to the container 32, through filter screen 46, to be recirculated. It will be seen then, that there is virtually no water waste and the container is kept free of debris.

The container 32 is made large enough to hold a daily supply of water for an average household pet and therefore the pet may be left unattended for a relatively long period. The simple mechanics of the construction enable a typical dog or cat to readily master the concept of stepping on the movable platform 20 to turn on the flow of water whenever it is thirsty. Moreover, the device is readily portable and may be taken when traveling without concern for plumbing or electrical hookups.

Figure 3:
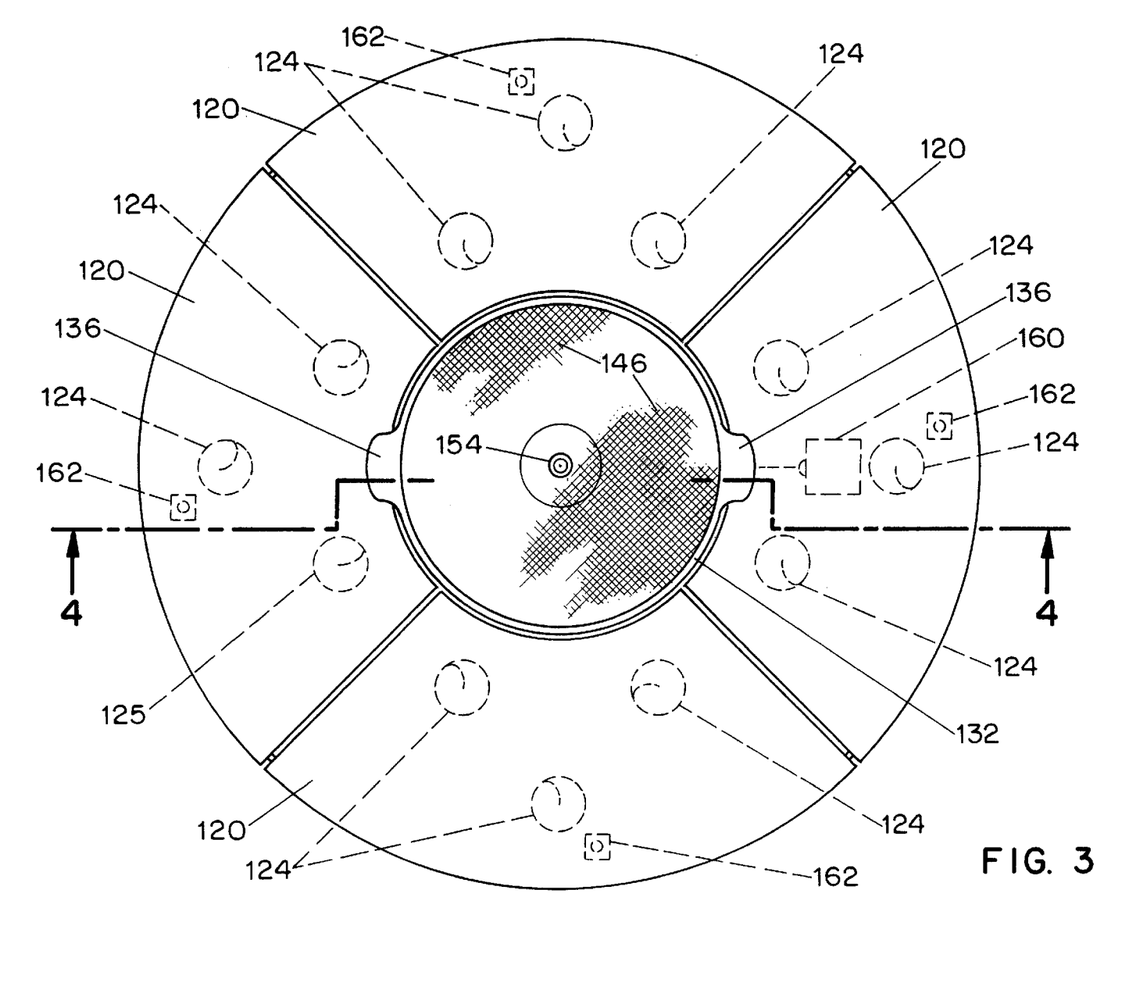
FIG. 3 is a plan view of a second embodiment of the invention in which four separate spring supported platforms surround the container.
Figure 4:
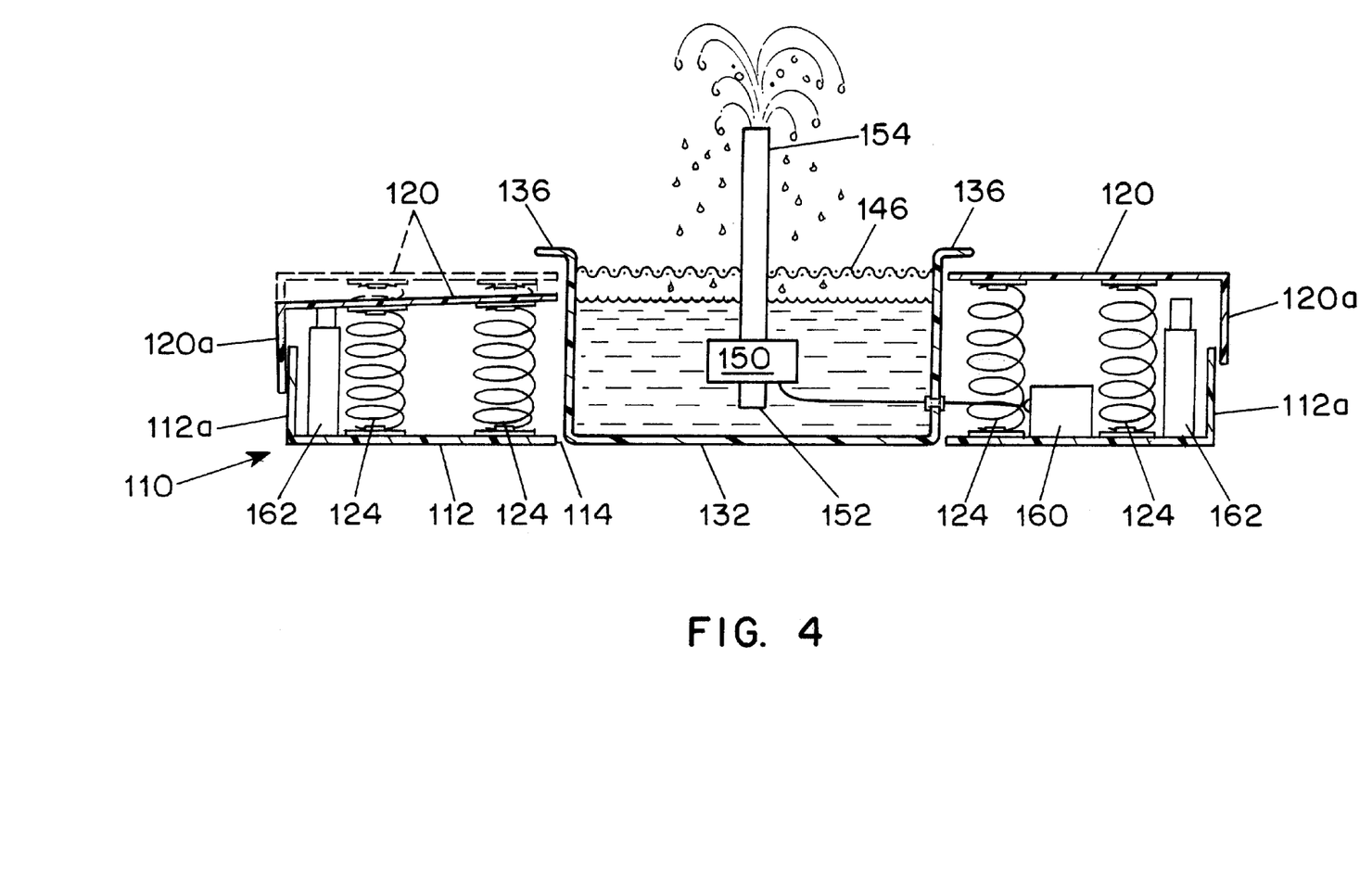
FIG. 4 is a cross-sectional view of the embodiment of FIG. 3, taken along the lines 4—4.

A variation of the device of FIGS. 1 and 2 is illustrated in FIGS. 3 and 4. In this embodiment, tube or spigot 154 may be approached from any direction and the arrangement also allows more than one animal to drink at the same time. The housing 110 is circular in shape and comprises a circular base 112 in which an opening 114 is provided to receive container 132. A plurality, four as shown, of movable platforms 120, each supported from the base 112 by a plurality of compression springs 124 which may be releasably connected to the base and platforms. A downwardly extending flange 120a along the outer edge of each of the platforms 120 cooperates with upwardly extending flange 112a around the periphery of the base 112 serves to minimize entry of dirt and debris into the interior of the structure.

As will be appreciated, the water container 132 and pump construction 150, 152, 154 are similar to elements 32, 50, 52, 54 in the embodiment of FIGS. 1 and 2. Similarly, filter screen 146 blocks solid particles from falling into the container 132.

A battery 160 mounted within the housing supplies electrical power to the pump 150 via pressure operated switches 162 mounted on the upper surface of base 112 so as to be closed when a respective platform 120 is depressed. As shown in the schematic circuit diagram of FIG. 5, the switches 162 are connected in parallel between battery 160 and pump 150 so that closure of any switch by depression of the associated platform portion will activate the pump.

As illustrated in FIG. 4, the platform 120 at the left of the figure is shown in solid line in its depressed position, such as when stepped on by a pet and in its normal, raised position, in dashed line.

Figure 8:
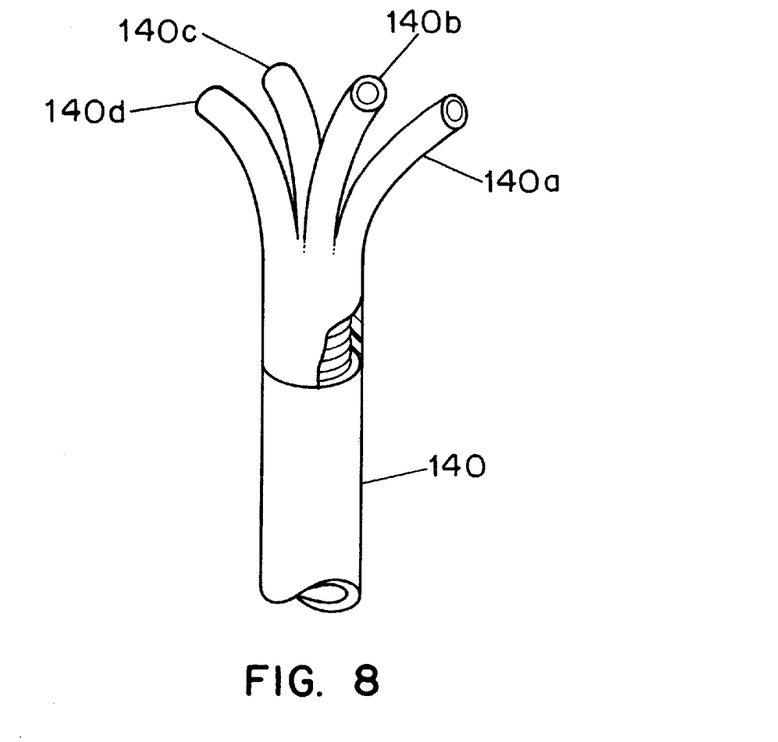
FIG. 8 is a partial view of a branched spigot that may be used with the embodiments of FIGS. 3 and 4 and FIGS. 6 and 7.

FIG. 8 illustrates a modification of a pipe or spigot such as 154 of the embodiment of FIGS. 3 and 4 to provide separate outputs for each of the platforms 120. The spigot 140 is divided into four separate output ends 140a–d and, one for each of the platforms 120, allowing multiple pets to drink at the same time. Preferably, the upper end of the pipe having the multiple spigot is removable, such as by a threaded connection as shown, to facilitate disasssembly and reassembly of the apparatus for cleaning.

Figure 5:
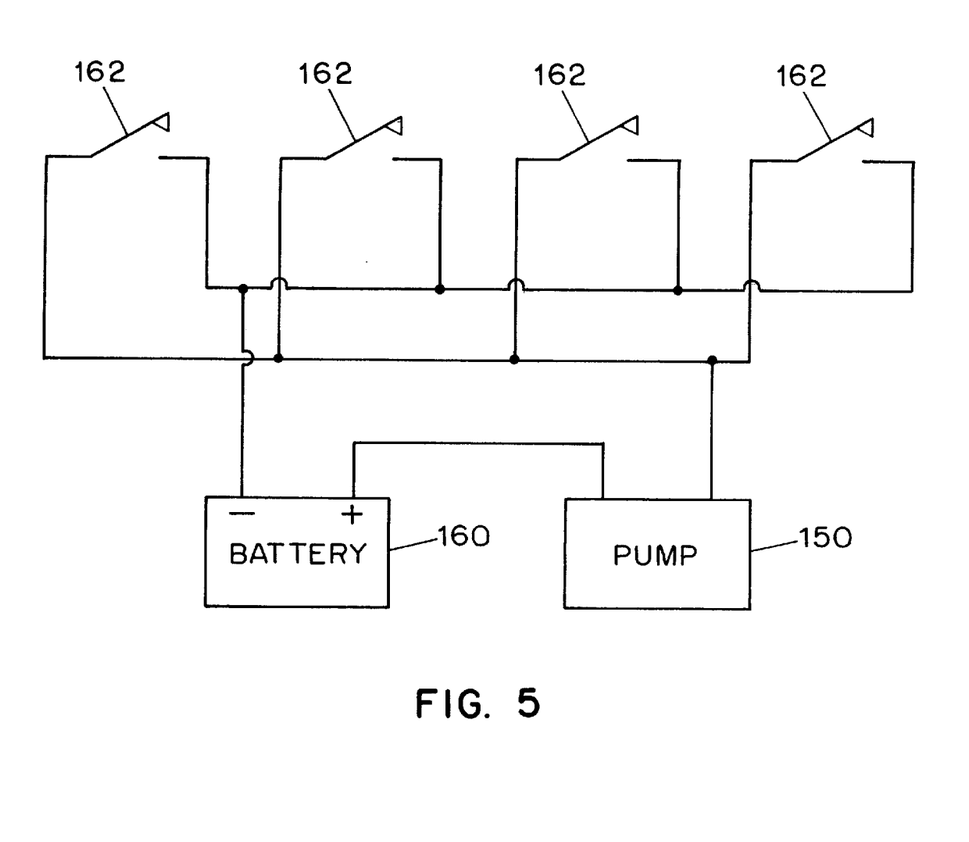
FIG. 5 is a schematic diagram showing the electrical connections between the battery, pump and switches of the embodiment of FIGS. 3 and 4.
Figure 6:
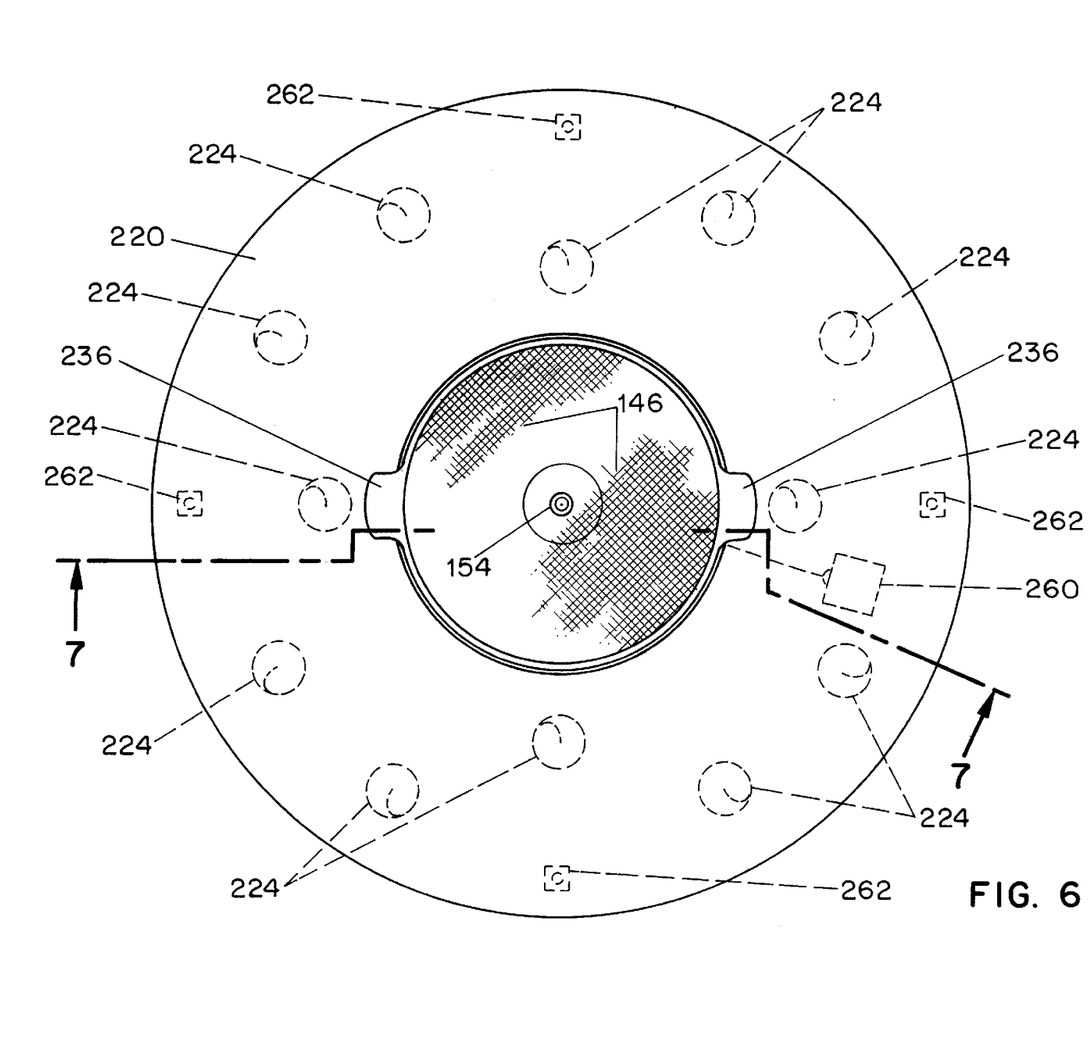
FIG. 6 is a plan view of an alternate construction of the embodiment of FIGS. 3 and 4 employing a single annular platform.
Figure 7:
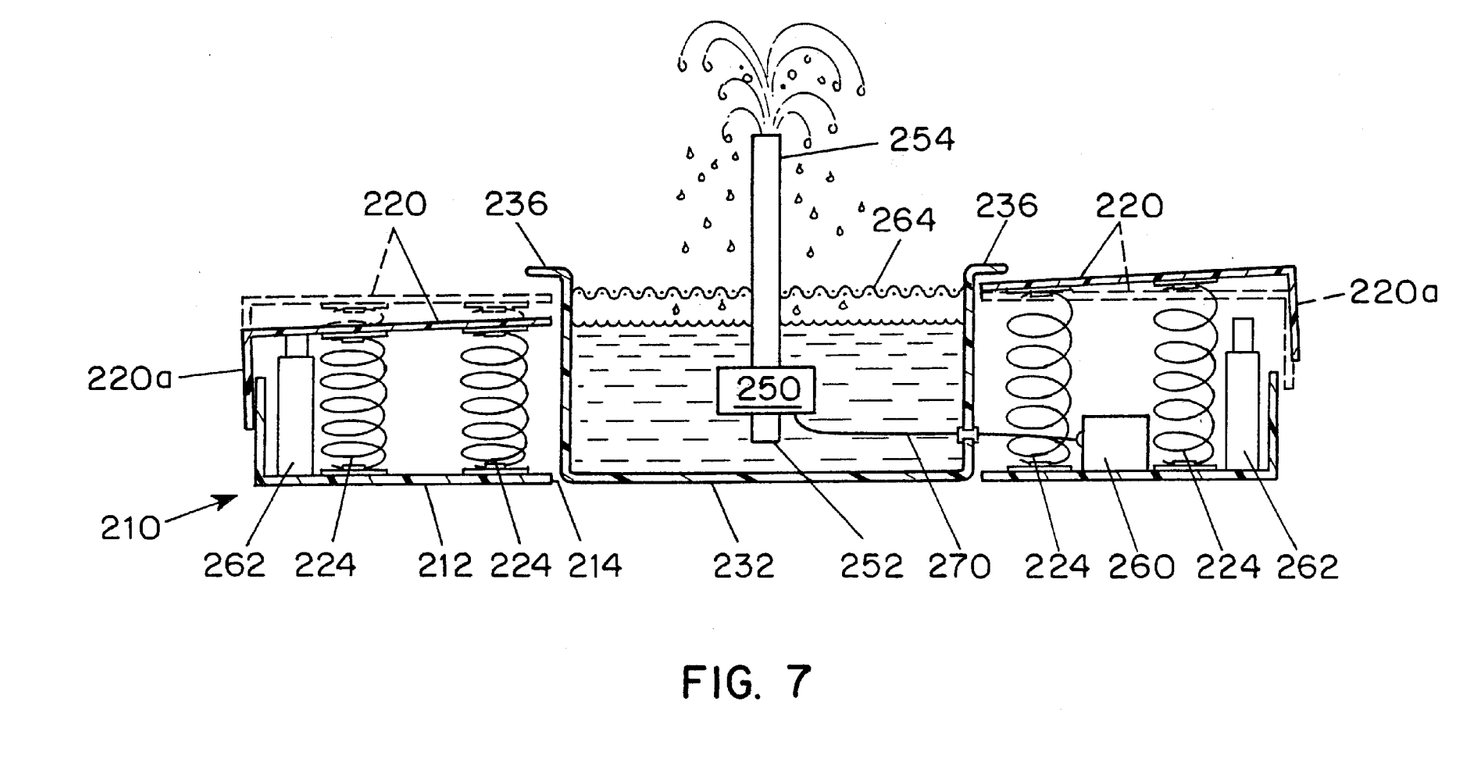
FIG. 7 is a cross-sectional view of the embodiment of FIG. 6 taken along the lines 7—7.

A modification of the embodiment of FIGS. 4 and 5 is illustrated in FIGS. 6 and 7. The housing 210 is circular in shape and includes a base 212 having an opening 214 to accommodate a container 232 for water. Pump 250 is connected by an electrical cord 270 passing in the earlier described embodiments, through the container, to the battery pack 260 via switches 262. Conveniently, four pressure switches 262 are provided equiangularly spaced around the inside of the rim of the housing base 212 and are connected to the pump and battery pack in accordance with the circuit of FIG. 5. Similarly, a filter screen 264 is fitted on the container 232.

The single platform 220 is in the form of an annular ring and is supported from the base 212 by a plurality of compression springs 224 equiangularly spaced around the housing 210. Conveniently, twelve such springs are used, although more or fewer may be employed, which are connected between the platform and base of the housing. The outer edge of the platform 220 is provided with a downwardly depending flange 220a and the base 212 has an upwardly extending flange 212a, similar to the construction of the embodiment of FIGS. 3 and 4. When a pet steps on the platform to get a drink, the side of the platform on which the pet steps, is depressed, as shown in solid line at left in FIG. 7, closing the nearest switch 262, thereby initiating the flow of water out of the spigot 254. The undepressed position of the platform is shown in dashed line in FIG. 7.

Figure 9:
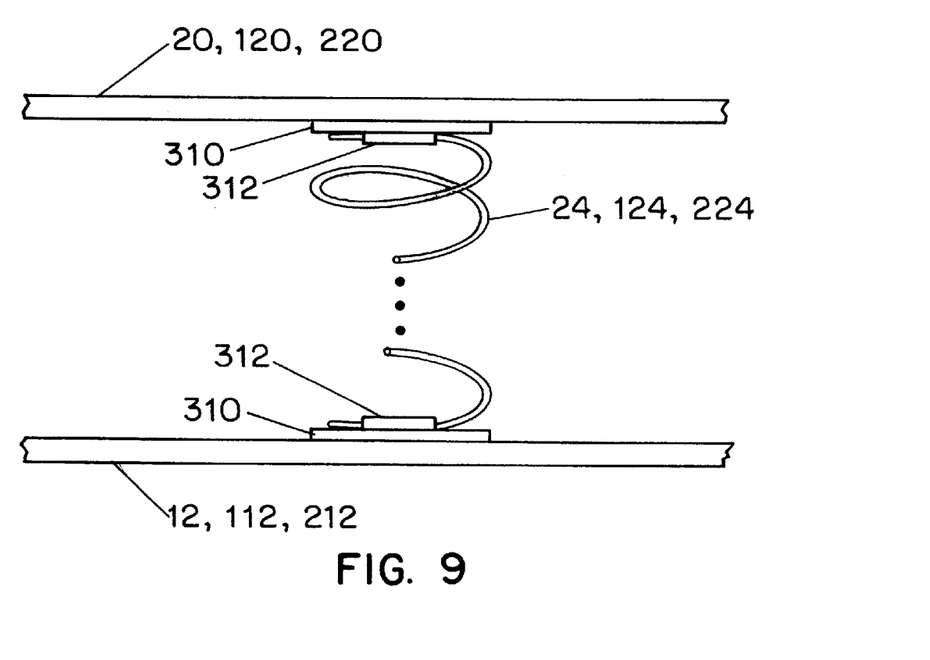
FIG. 9 is a detail view illustrating the coupling of the supporting springs between the platforms and bases of the various embodiments.

In all of the illustrated embodiments, the depressable platforms are supported on compression springs secured between the undersides of the respective platform or platforms and the upper surface of the respective base. As illustrated in FIG. 9, the springs may be in the form of a compressible coil, each end of which is attached to a flat rigid sheet of metal or plastic 130, such as by a loop attached to or formed in the sheet, which in turn is cemented or otherwise fastened to the respective platform or base surface.

In the various embodiments, the housings, including the movable platform portions may be made of plastic, metal or wood. Although coil springs are shown as supporting the movable platforms, other types of springs or hydraulic or pneumatic devices may be employed, as desired. Other variations and modifications of the embodiments described may be made without departing from the scope of the invention, as set forth in the appended claims.

I claim:

1. A pet-controlled drinking fountain comprising:

a housing;

a generally bowl shaped container for holding a supply of potable liquid disposed within said housing;

an electrically operated pump disposed within said container, said pump having an intake for said potable liquid near the bottom of said container and an outlet;

a vertically oriented hollow pipe extending upwardly from said pump outlet above said container;

an electrical power supply for said pump within said housing;

a normally open switch coupling said power supply to said pump; and a spring-biased member for closing said switch in response to pressure on said member.

2. The drinking fountain of claim 1, wherein said electrical power supply is a battery.

3. The drinking fountain of claim 1, wherein said spring-biased member comprises a platform upon which a pet can step to approach said vertically oriented hollow pipe.

4. The drinking fountain of claim 1, including a plurality of normally open switches and a plurality of spring-biased members each of which closes a respective one of said switches, each of said spring-biased members comprising a platform upon which a pet can step to approach said vertically oriented hollow pipe.

5. A pet-controlled drinking fountain comprising:

a housing having a base, at least one platform disposed above and movable towards said base, a spring coupled between said base and said movable platform normally urging said platform upward, a container for potable liquid having an open top received within said housing, an electrically operated pump disposed within said container, said pump having an intake for said potable liquid near the bottom of said container and an outlet, a vertically oriented hollow pipe extending upwardly from said pump outlet above said container a battery disposed within said housing for supplying power to said pump; and a normally open switch electrically coupling said battery to said pump; said switch being mounted in said housing to be actuated by downward movement of said at least one platform, whereby downward pressure exerted by a pet stepping on said platform will activate said pump to cause potable liquid to flow out of said vertically oriented hollow pipe.

6. The drinking fountain of claim 5, further comprising a removable filter screen covering the open top of said container.

7. The drinking fountain of claim 5 wherein said vertically oriented hollow pipe comprises a plurality of output ends, whereby upon actuation of the pump, liquid flows out of each of said output ends.

8. The drinking fountain of claim 5 wherein the base of said housing is rectangular in shape and wherein said housing further includes an end wall, a pair of side walls extending upwardly from said base and a top surrounding said container joined to the upper edges of said end wall and side walls, said platform being movable downwardly between said pair of side walls.

9. The drinking fountain of claim 5, wherein the base of said housing is circular in shape, and wherein a plurality of said platforms surround said container above said base.

10. A pet controlled drinking fountain comprising:

a housing having a circular base;

a container for holding a supply of potable liquid disposed within said housing;

an electrically operated pump disposed within said container, said pump having an intake for said potable liquid near the bottom of said container and an outlet;

a vertically oriented hollow pipe extending upwardly from said pump outlet above said container;

an electric power supply for said pump within said housing;

a plurality of normally open switches coupling said power supply to said pump, wherein closure of any one of said switches is effective to activate said pump;

an annular platform having an inner perimeter surrounding said container and an outer perimeter extending outwardly of said circular base; and a plurality of springs extending between the under surface of said annular member and said base for supporting said annular member above the base whereby a pet stepping on said annular member will depress said member downwardly towards the base against the action of said springs;

said switches being mounted in said housing such that one or more of said switches will be closed upon depression of said annular platform by a pet.

11. The pet fountain of claim 10 further comprising:

a downwardly depending flange extending from the outer periphery of said annular member and an upwardly extending flange around the outer periphery of said base.

* * * * *